United States Patent

[11] 3,625,773

| [72] | Inventors | Richard J. Charles<br>Schenectady;<br>Stephan P. Mitoff, Elnora; William G. Morris, Schenectady, all of N.Y. |
|---|---|---|
| [21] | Appl. No. | 885,961 |
| [22] | Filed | Dec. 17, 1969 |
| [45] | Patented | Dec. 7, 1971 |
| [73] | Assignee | General Electric Company |

[54] METHOD OF PRODUCING BETA-ALUMINA ELECTROLYTES
7 Claims, No Drawings

[52] U.S. Cl.................................................. 136/153,
106/65, 204/295
[51] Int. Cl........................................................ H01m 11/00,
B01k 3/12

[50] Field of Search............................................ 136/153;
106/39, 58, 65; 252/518, 521; 204/295

[56] References Cited
UNITED STATES PATENTS

| 3,311,482 | 3/1967 | Klingler et al. ............... | 106/65 |
| 3,458,356 | 7/1969 | Kummer et al. ............... | 136/153 |
| 3,499,796 | 3/1970 | Hever et al. ................... | 136/153 |

Primary Examiner—Donald L. Walton
Attorneys—Richard R. Brainard, Paul A. Frank, Charles T. Watts, Frank L. Neuhauser, Oscar B. Waddell and Joseph B. Forman ABSTRACT: High-density beta-alumina bodies having low electrical resistivity values are produced by a process including a consolidation operation such as a sintering step carried out in a dry oxygen atmosphere.

METHOD OF PRODUCING BETA-ALUMINA ELECTROLYTES

METHOD OF PRODUCING BETA-ALUMINA ELECTROLYTES

The present invention relates generally to electrolytic ceramics and is more particularly concerned with a novel method for the production of beta-alumina bodies having special utility as solid electrolytes.

Solid electrolytes afford the opportunity of constructing electrical energy storage devices of a variety of combinations of electrode materials useful over a broad range of operating temperature conditions. Thus, for instance, a high-energy battery has been constructed in which the anode is of sodium, the cathode is of sulfur and the sodium and sulfur are both in the molten state at cell operating temperature and are in contact with and separated by a sodium beta-alumina electrolyte. Cells of this type, however, have substantial internal resistance attributable to the undesirably high resistivity of the solid electrolyte approximating at best about 100 ohm-centimeters at operating temperature approximating 300° C. Thus, while the incorporation of small amounts of various additives such as MgO, NiO, CoO and $Fe_2O_3$ has enabled some improvement in the electrical conductivity of these bodies, apparently through promotion of sintering action in most cases, cell resistance has remained a major obstacle to development of such batteries in practical use.

We have observed that while density and conductivity are generally related in such beta-alumina bodies, conductivity is not improved as density is increased through prolonged sintering under the usual conditions. Upon investigation of the cause of this result, we have discovered that there is a substantial loss of alkali metal oxide from the beta-alumina during such sintering operations. We have further found that this loss results from reaction of sodium oxide or potassium oxide with water in the sintering atmosphere to form the hydroxide, and also results from dissociation of the sodium or potassium oxide and vaporization of the alkali metal. Still further, we have found that these reactions can readily be drastically limited by establishing and maintaining conditions which either do not support such reactions or tend to drive them in the reverse direction. Thus, a hot-pressing operation in which the available atmosphere is of negligible volume yields a beta-alumina body of 85 percent density and resistivity less than 20 ohm-centimeters (at 300° C.). Likewise, weave established that such a product can consistently be obtained either by sintering or by plasma spraying under a dry oxygen atmosphere.

We have also found that compacting pressures of the order of 25,000 p.s.i. are adequate for the production of green bodies to be sintered. Still further, no offsetting substantial disadvantage is incurred in using these discoveries of ours instead of the prior art practices.

Described generally, an article of the present invention comprises a beta-alumina body of density greater than 85 percent theoretical density containing 0.5 to 5.0 percent MgO having an electrical resistivity at 300° C. less than 20 ohm-centimeters. Preferably, the amount of MgO in the article is about 2 percent and also preferably the article is made in the form of either a tube or a plate and, in either case, is preferably of thickness approximating 20 mils. Finally, in its preferred form, the ceramic body of this invention has a density greater than 98 percent theoretical density of the material of the body.

In its process aspect, this invention generally includes the steps of mixing either sodium beta-alumina or potassium beta-alumina in powder form with a source of from 0.5 percent to 5.0 percent of magnesia, and subjecting the resulting substantially uniform mixture to an elevated temperature and thereby bonding the mixture of particles together in a consolidated mass in the form of a desired ceramic body, the magnesia being in solid solution in the beta-alumina in the finished product. As indicated above, this general method may be carried out either as a hot-pressing operation, or as a sintering operation, or as a plasma-arc spraying operation. In the case of sintering and plasma-arc spraying operations, it is essential, as indicated above, that the atmosphere to which the powder mixture is subjected during the consolidating heat treatment be dry and that it contain oxygen in substantial proportion. In the hot-pressing operation carried out in accordance with conventional hot-pressing practice, there is substantially no atmosphere and consequently no necessity for special atmosphere control, the powder material being placed in a mold of a suitable form to provide a ceramic product of the desired shape. After the mold is closed, pressure and heat are applied to accomplish consolidation, the powder mixture temperature being raised above 1,600° C. and preferably not above 1,900° C., but in any event not up to the melting temperature of the mixture.

The duration of the period that the powdered material is at temperature in the consolidation stage varies considerably from one process of this invention to another. Thus, in the case of the plasma-arc spraying species of the present invention, the powder mixture is rapidly heated to temperature well above 2,000° C. and quickly cooled below that temperature as the hot powder impinges upon a substrate body, the entire period during which the mixture is subjected to temperatures above 1,000° C., consequently being of the order of 2 or 3 seconds at most. At the other extreme, a powder mixture in the form of a green body is subjected to temperatures in the range of 1,700° to 1,900° C., for 2 hours or more in a typical sintering operation of this invention. In the hot-pressing operation, the powder mixture is maintained under pressure and at a temperature of 1,700° to 1,900° C., for an hour or more.

In preparing the powder mixture for processing in accordance with one or another of the three method species of this invention, sodium beta-alumina or potassium beta-alumina or a mixture of the two may be employed. These materials in the form of powders, preferably of particle size less than 1 micron, are mixed with magnesia, suitably in the form of magnesium carbonate or preferably in the form of periclase particles which are of particle size less than 1 micron. Sodium oxide, suitably in the form of sodium carbonate, of about the same particle size, is preferably also added and dry mixed with the magnesia and alumina materials. The amounts of these materials in the resulting mixture are such that the ultimate beta-alumina electrolyte body will contain from 0.5 to 5.0 percent magnesia and preferably the equivalent of about 6 to 8 percent sodium oxide in combined form. In the event that magnesia is employed instead of magnesium carbonate and sodium carbonate is not used in the mixture, the powder mixture may be die pressed at about 25,000 p.s.i. to provide a green body which then may be sintered at a temperature from 1,700° to 1,900° C. in a suitable atmosphere to provide the desired electrolyte body. If magnesium carbonate or sodium carbonate is incorporated in the mixture of powder, the mixture is calcined for the removal of substantially all moisture and $CO_2$ before being subjected to sintering conditions. Alternatively, either the uncalcined or calcined powder mixture may be fed through plasma-arc spraying apparatus and deposited as an electrolyte body on a suitable substrate form.

In accordance with this invention, the atmosphere in either the sintering or the plasma-arc spraying operation is preferably substantially a pure oxygen atmosphere having a dew point below −80° F. Dilute oxygen atmospheres may also be used and, in fact, an atmosphere as dilute as air will give satisfactory results, providing that the moisture content is not in excess of that stated just above. In our preferred practice, we employ pure tank oxygen which has a dew point below −80° F. and we run this gas through a calcium chloride train on the way into the sintering or plasma-arc spray chamber. Also, in the sintering operation, we deliver dry oxygen continuously into the furnace chamber such that oxygen flow over the beta-alumina charge is at the linear rate of about 5 feet per minute.

The following illustrative, but not limiting, examples of the process of this invention set forth in more detail typical beta-alumina electrolyte production operations.

EXAMPLE I

One hundred grams of a commercial sodium beta-alumina (high-temperature refractory produced by Harbison Carborundum Corporation and identified as Monofrax H) is pulverized to −200 mesh. Two grams of −200 mesh magnesia (periclase) powder is dry mixed with the sodium beta-alumina powder and the resulting substantially uniform mixture is formed in a die at 25,000 p.s.i. to provide a green body disc. This disc is then fired at 1,825° C. for 2 hours in oxygen having a dew point below −80 F. The resulting dense, sintered body proves on standard test to have electrical resistivity at 300° C. between 12 and 25 ohm-centimeters.

EXAMPLE II

To a 100-gram mixture of the powders prepared as described in example I is added 2.5 grams of sodium carbonate. The resulting powder mixture is then calcined at 1,600° C. for 2 hours for the removal of all water and $CO_2$. The calcined powder is then placed in a hot-pressing die and subjected to compaction pressure of 25,000 p.s.i. for 1 hour during which time the powder mixture is maintained at 1,650° C. Upon cooling of the consolidated powder mixture in the die to 1,000° C., the die is opened and the resulting thin disc electrolyte body is removed for electrical resistivity test establishing a value between 12 and 25 ohm-centimeters at 300° C.

EXAMPLE III

Another powder mixture as described in example I is plasma-arc sprayed upon a 1 inch platinum disc. The deposited body of sodium beta-alumina upon removal from the substrate disc is tested and found to have an electrical resistivity of 12 to 25 ohm-centimeters. The thickness of this body, as in the cases of those of examples I and II, is substantially uniform and about 20 mils.

Wherever in the specification and claims hereof percentages, ratios or proportions are recited, reference is to the weight basis rather than volume basis unless otherwise specified.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. The method of making a ceramic body having density greater than 85 percent of theoretical density and electrical resistivity less than 100 ohm-centimeters at 300° C. and consequently having special utility as a solid electrolyte in a sodium-sulfur battery which includes the steps of mixing sodium beta-alumina or potassium beta-alumina powder and a source of from 0.5 percent to 5.0 percent of magnesia, forming a green body of the resulting substantially uniform mixture, and firing the green body under a dry atmosphere containing free oxygen at a temperature between about 1,700° C. and 1,900° C. and thereby sintering the body.

2. The method of making a ceramic body having density greater than 85 percent of theoretical density and electrical resistivity less than 100 ohm-centimeters at 300° C., and consequently having special utility as a solid electrolyte in a sodium-sulfur battery which includes the steps of mixing sodium beta-alumina or potassium beta-alumina powder and a source of from 0.5 percent to 5.0 percent of magnesia, and hot pressing the resulting substantially uniform mixture in the absence of an atmosphere at a temperature between about 1,600° C. and 1,900° C. to produce the desired ceramic body.

3. The method of claim 1 in which a substantially uniform powder mixture of the beta-alumina and the magnesia source is sintered for about 2 hours at about 1,825° C., under a dry oxygen atmosphere.

4. The method of claim 1 in which a substantially uniform mixture of beta-alumina and about 1.5 percent sodium oxide and from 0.5 percent to 5.0 percent magnesia is sintered at from 1,700° C. to 1,900° C.

5. The method of claim 1 in which as a preliminary step the beta-alumina and magnesia in the form of powders of particle size less than 1 micron are dry mixed together to provide a substantially uniform powder mixture, and the resulting powder mixture is subjected to a pressure of about 25,000 p.s.i. and thereby formed into a green body of predetermined shape.

6. The method of claim 1 in which the magnesia source is magnesium carbonate and in which between about 6 and 8 percent of sodium oxide in the form of finely divided sodium carbonate is mixed together with the alpha alumina and magnesium carbonate powders.

7. The method of making a ceramic body having density greater than 85 percent of theoretical density and electrical resistivity less than 100 ohm-centimeters at 300° C. and consequently having special utility as a solid electrolyte in a sodium-sulfur battery which includes the steps of mixing sodium beta-alumina or potassium beta-alumina powder and a source of from 0.5 percent to 5.0 percent of magnesia, and plasma-arc spraying the resulting substantially uniform mixture under a dry atmosphere containing free oxygen and thereby depositing on a substrate the desired ceramic electrolyte body.

* * * * *